(12) United States Patent
Huber et al.

(10) Patent No.: US 8,700,288 B2
(45) Date of Patent: Apr. 15, 2014

(54) METHOD FOR ASSESSING A METHOD OF FUNCTIONING OF A FUEL INJECTOR IN RESPONSE TO THE APPLICATION OF A CONTROL VOLTAGE, AND CORRESPONDING EVALUATION DEVICE

(75) Inventors: Andreas Huber, Steinheim (DE); Thomas Breitbach, Stuttgart (DE); Rainer Peck, Ludwigsberg (DE); Christian Kriechbaum, Stuggart (DE)

(73) Assignee: Robert Bosch GmbH, Stuttgart (DE)

( * ) Notice: Subject to any disclaimer, the term of this patent is extended or adjusted under 35 U.S.C. 154(b) by 969 days.

(21) Appl. No.: 12/600,802

(22) PCT Filed: Jul. 23, 2008

(86) PCT No.: PCT/EP2008/059653
§ 371 (c)(1),
(2), (4) Date: Nov. 18, 2009

(87) PCT Pub. No.: WO2009/033869
PCT Pub. Date: Mar. 19, 2009

(65) Prior Publication Data
US 2010/0152994 A1    Jun. 17, 2010

(30) Foreign Application Priority Data
Sep. 10, 2007   (DE) .................. 10 2007 042 994

(51) Int. Cl.
*G01M 15/00* (2006.01)
*G01F 9/00* (2006.01)

(52) U.S. Cl.
USPC ........... 701/103; 701/104; 701/109; 123/672; 123/674; 73/114.38; 73/114.45; 73/114.48

(58) Field of Classification Search
CPC . F02M 65/001; F02M 65/002; F02M 65/003; F02D 41/2096; F02D 41/22; F02D 41/221; F02D 41/2451; F02D 41/2461
USPC ......... 123/299, 300, 304, 305, 672, 673, 674, 123/679; 73/114.38, 114.45, 114.48
See application file for complete search history.

(56) References Cited

U.S. PATENT DOCUMENTS 5,633,458 A * 5/1997 Pauli et al. .................. 73/114.51
6,085,142 A * 7/2000 Di Leo et al. ................. 701/104
6,125,823 A * 10/2000 Thomas ........................ 123/464

(Continued)

FOREIGN PATENT DOCUMENTS

CN          1880744        12/2006
DE     10 2006 013 166      9/2007

(Continued)

*Primary Examiner* — Stephen K Cronin
*Assistant Examiner* — Raza Najmuddin
(74) *Attorney, Agent, or Firm* — Kenyon & Kenyon LLP

(57) ABSTRACT

A method for assessing a method of functioning of a fuel injector in response to the application of a control voltage to at least one actuator of the fuel injector, including the steps of applying the control voltage to the at least one actuator of the fuel injector for a no-torque-generating injection into an engine, determining a fuel content in an exhaust tract disposed at an engine, comparing the determined fuel content with a specified comparison value, and assessing the method of functioning of the fuel injector based on the comparison result. Furthermore, also described is an evaluation device for assessing a method of functioning of a fuel injector in response to the application of a control voltage.

11 Claims, 3 Drawing Sheets

(56) References Cited

U.S. PATENT DOCUMENTS

| | | | |
|---|---|---|---|
| 6,247,451 B1 * | 6/2001 | Estevenon et al. | 123/456 |
| 6,279,560 B1 * | 8/2001 | Mauro et al. | 123/674 |
| 6,357,420 B1 * | 3/2002 | Matta | 123/446 |
| 6,363,314 B1 * | 3/2002 | Hafner et al. | 701/104 |
| 6,584,962 B2 * | 7/2003 | Nonomura et al. | 123/491 |
| 6,698,396 B2 * | 3/2004 | Pfaeffle et al. | 123/299 |
| 6,705,294 B2 * | 3/2004 | Shinogle | 123/486 |
| 6,722,345 B2 * | 4/2004 | Saeki et al. | 123/435 |
| 6,732,577 B2 * | 5/2004 | Leman et al. | 73/114.48 |
| 6,745,620 B2 * | 6/2004 | Kreikemeier et al. | 73/114.72 |
| 6,755,176 B2 * | 6/2004 | Takeuchi et al. | 123/299 |
| 6,801,847 B2 * | 10/2004 | Jaliwala et al. | 701/104 |
| 6,964,261 B2 * | 11/2005 | Warne et al. | 123/436 |
| 6,990,958 B2 * | 1/2006 | Asano et al. | 123/436 |
| 7,021,288 B2 * | 4/2006 | Asano et al. | 123/435 |
| 7,206,720 B2 * | 4/2007 | LaPant | 702/182 |
| 7,319,930 B2 * | 1/2008 | Dietl et al. | 701/104 |
| 7,343,240 B2 * | 3/2008 | Sugiyama et al. | 701/104 |
| 7,359,792 B2 * | 4/2008 | Nishie | 701/104 |
| 7,588,515 B2 * | 9/2009 | Miyazaki | 477/111 |
| 7,628,146 B2 * | 12/2009 | Kloppenburg et al. | 123/673 |
| 7,729,845 B2 * | 6/2010 | Iwashita et al. | 701/104 |
| 7,841,319 B2 * | 11/2010 | Thomas | 123/478 |
| 7,845,343 B2 * | 12/2010 | Imai | 123/674 |
| 7,881,857 B2 * | 2/2011 | Samenfink et al. | 701/105 |
| 7,895,990 B2 * | 3/2011 | Ishizuka et al. | 123/478 |
| 7,899,603 B2 * | 3/2011 | Yamamoto et al. | 701/104 |
| 8,010,277 B2 * | 8/2011 | Ishizuka et al. | 701/114 |
| 2004/0099054 A1 * | 5/2004 | Shinogle | 73/119 A |
| 2007/0192019 A1 * | 8/2007 | Bohnig et al. | 701/114 |
| 2008/0103676 A1 * | 5/2008 | Ancimer et al. | 701/103 |
| 2009/0093948 A1 * | 4/2009 | Richert et al. | 701/103 |
| 2009/0281710 A1 * | 11/2009 | Mallebrein et al. | 701/104 |
| 2010/0152994 A1 * | 6/2010 | Huber et al. | 701/103 |
| 2011/0137541 A1 * | 6/2011 | Malikopoulos | 701/106 |

FOREIGN PATENT DOCUMENTS

| | | |
|---|---|---|
| EP | 1 146 216 | 10/2001 |
| EP | 1 318 288 | 6/2003 |
| GB | 2 423 833 | 9/2006 |
| JP | 10-288119 | 10/1998 |
| JP | 11-107836 | 4/1999 |
| JP | 2002-295328 | 10/2002 |
| JP | 2002-303192 | 10/2002 |
| JP | 2002-371896 | 12/2002 |

\* cited by examiner

METHOD FOR ASSESSING A METHOD OF FUNCTIONING OF A FUEL INJECTOR IN RESPONSE TO THE APPLICATION OF A CONTROL VOLTAGE, AND CORRESPONDING EVALUATION DEVICE

FIELD OF THE INVENTION

The present invention relates to a method for assessing a method of functioning of a fuel injector in response to the application of a control voltage. Furthermore, the present invention relates to an evaluation device for assessing a method of functioning of a fuel injector in response to the application of a control voltage.

BACKGROUND INFORMATION

German patent document DE 10 2006 013 166 discusses a method and a control device for determining an opening voltage of an injector having a piezo actuator. The opening of the injector is determined by interrupting the current supply at a holding voltage and then measuring a voltage change present at the piezo actuator and comparing it with a comparison voltage increase.

A fuel injector, e.g., a common rail injector (CRI), frequently has at least one actuator. The at least one actuator may be a piezo actuator, for instance. In this case, a control voltage is applied to the at least one actuator in order to inject fuel into an internal combustion engine. The at least one actuator then experiences an expansion because of the applied control voltage, and it simultaneously exerts pressure on a switching chain disposed on the at least one actuator, which has an hydraulic coupler, for example. A switching valve situated behind the switching chain, possibly a hydraulic servo valve, is moved into an opening position in this manner. If the switching valve is in its opening position, then the fuel is able to flow from the fuel tank into the internal combustion engine.

For precise metering of the fuel injected into the internal combustion engine, the control voltage should be selected in such a way that the switching valve is shifted into its opening position using a defined excess of force. The fact that the control voltage for shifting the switching valve into its opening position is a function of a rail pressure must be taken into account here.

The control voltage is frequently determined individually for each fuel injector during the injector production. A characteristics curve for the control voltage determined for the opening of the fuel injector as a function of the particular rail pressure is subsequently stored in an injection control device for the control of the fuel injector. This is also referred to as injector-specific voltage balancing (ISB).

However, both the at least one actuator and also the switching chain are subject to drift during their service life. Thus, during operation of the fuel injector in a vehicle, there also results a deviation between the control voltage required to open the fuel injector and the original characteristics curve.

It is therefore advantageous if the characteristics curve of the control voltage required for opening the fuel injector is checked during operation of the fuel injector. This check should be carried out especially by taking the particular rail pressure into account. However, the prior art currently provides no possibilities for performing this check without a loss in comfort for the driver, for instance as a result of a noise generation, or without noticeable effect on the dynamic response of the vehicle.

The present invention provides a method having the features described herein and an evaluation device having the features described herein.

The method according to the present invention is based on the understanding that the frequency and the volume of the noise generated during an assessment of the method of functioning of the fuel injector in response to the application of a control voltage is able to be reduced considerably if the particular control voltage for a no-torque-generating injection is applied to the at least one actuator of the fuel injector. Such a no-torque-generating injection is frequently also referred to as post-injection.

In contrast, in the method according to the present invention, there is hardly any noise generation in a performed no-torque-generating injection. In the same way, the dynamic behavior of the vehicle when the method according to the present invention is carried out while driving is hardly affected. As a result, the method according to the present invention is able to be performed regularly during driving without resulting in a loss of comfort for the driver.

Moreover, the method according to the present invention is based on the understanding that a completed no-torque-generating injection is able to be verified by a sensor device for determining a fuel content in the exhaust tract, which is usually installed in the vehicle already. To execute the method, it will therefore not be necessary to install an additional sensor device in the internal combustion engine or in the exhaust tract. This saves the expense and installation space for an additional sensor device. The measured fuel content may be a fuel/air ratio or a fuel quantity in the exhaust tract. The no-torque-generating injection may thus be verified even after the fuel in the engine has been ignited.

It may be determined that the application of the control voltage to the at least one actuator does not cause the fuel injector to open if the determined fuel content is less than the comparison value, and that the application of the control voltage to the at least one actuator causes the fuel injector to open if the determined fuel content is greater than the comparison value. In this way it is easy to determine whether drift of the at least one actuator or the switching chain at the fuel injector is present.

In one specific embodiment of the method, the fuel content in the exhaust tract is determined with the aid of a Lambda sensor. Virtually all vehicles with a weight of more than 1,500 kgs are normally equipped with a Lambda sensor, which is provided to ensure that the specified emission values will not be exceeded. Such a Lambda sensor permits a reliable verification of a performed no-torque-generating injection.

The control voltage may be applied at the at least one actuator at a piston position at which no torque is released during the combustion of fuel possibly injected into the engine. This makes it virtually impossible for noise to be generated when executing the method.

In one specific embodiment, the application of the control voltage to the at least one actuator is executed at a piston position at which the fuel possibly injected into the engine is no longer ignited. This prevents the generation of combustion noise or heat when implementing the method. This specific development of the method is therefore especially suitable for an implementation while driving.

In addition, a rail pressure may be measured and the method of functioning of the fuel injector evaluated as a function of the rail pressure. The method thus also considers the relation between the control voltage required to open the fuel injector and the instantaneously present rail pressure.

In one further development of the method, an initial value for the control voltage is specified at the beginning of the method. For example, such an initial value may be the control voltage specified by the manufacturer for the newly produced fuel injector at the current rail pressure.

In one further development, if the determined fuel content is smaller than the comparison value, then the control voltage is increased by a first specified voltage difference and the method repeated at least once more in order to determine as newly determined control voltage a control voltage whose application to the at least one actuator causes an opening of the fuel injector. Therefore, the method may not only be used to determine whether drift has occurred at the at least one actuator or the switching chain of the fuel injector. In addition, a control voltage suitable for opening the fuel injector may be determined anew as soon as such a situation is determined.

In the same way, if the determined fuel content is greater than the comparison value, then the control voltage may be reduced by a second specified voltage difference, the method repeated at least once more, and then the smallest control voltage be determined as newly ascertained control voltage, at whose application to the at least one actuator an opening of the fuel injector is determined. The second voltage difference may be selected substantially lower than the first voltage difference. This makes it possible to determine the smallest control voltage that induces the fuel injector to open in a relatively precise manner. Following a longer operation of a fuel injector, the present invention therefore makes it possible to newly determine the control voltage to be applied to the actuator for a reliable injection with a minimum tolerance range during a normal driving operation. The control voltage to be applied to the particular actuator may be determined anew as a function of the rail pressure. The determined correction values may then be individually stored in a correction characteristics map.

In one further development of the method, a characteristics curve for an optimal control voltage is determined as a function of the rail pressure on the basis of the newly determined control voltage. In the application of the fuel injector, a number of empty points are specified that permit a sufficiently unambiguous identification of the actuator. When corresponding releases exist, which are, for example, a rail pressure, an exhaust-gas temperature or further stationarities, then the empty points with their control voltage variations are measured one after the other in order to check the installed actuators. If all empty points of the actuators have been measured, then the fingerprint created in this manner is compared with the minimum voltage requirement values originally stored for this actuator and stored in the characteristics map. These characteristics map values are then available to correct the charge voltage control of the individual actuators.

The aforementioned advantages of the method according to the present invention also apply to a corresponding evaluation device. This evaluation device may also be used for a drift correction of the actuators installed on a fuel injector, thereby ensuring perfect functioning of the actuators during the entire operation.

Additional possible uses and advantages of the present invention result from the following descriptions of exemplary embodiments, which are shown in the figures.

DETAILED DESCRIPTION

Figure 1:
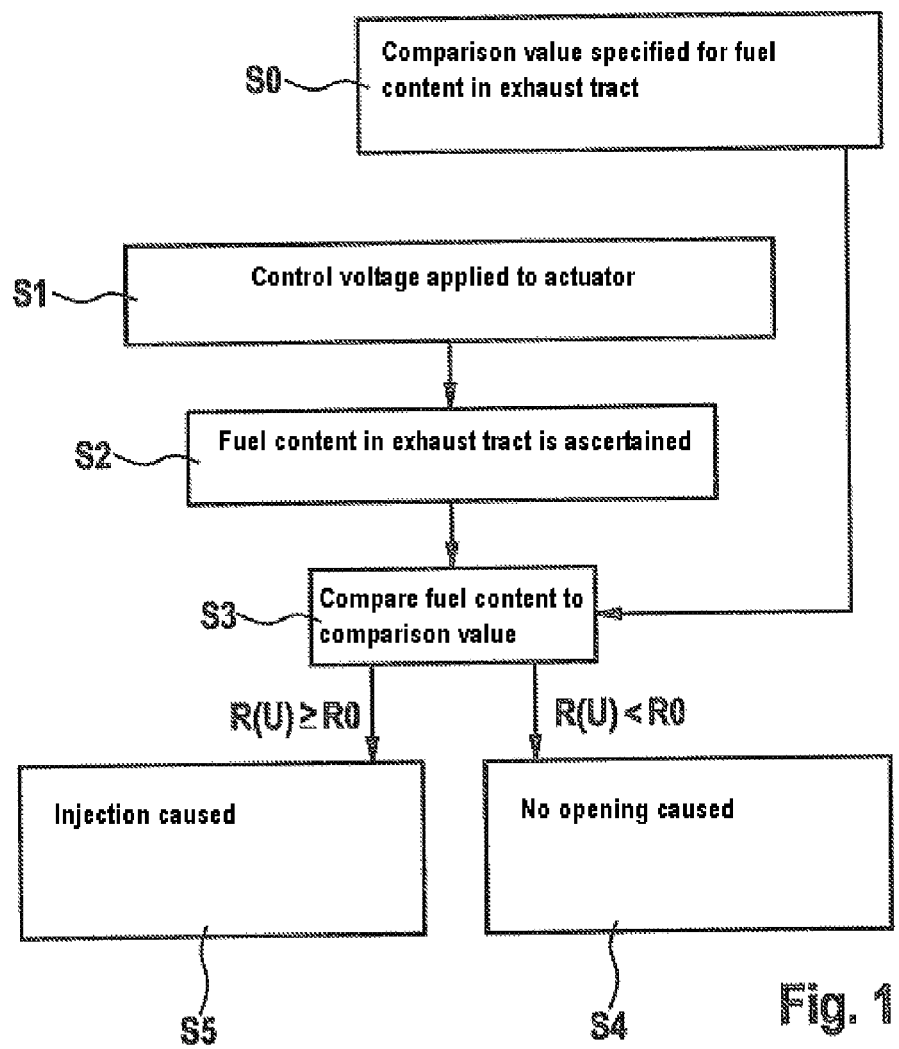
FIG. 1 shows a flow chart of a first specific embodiment of the method for assessing a method of functioning of a fuel injector in response to the application of a control voltage.

FIG. 1 shows a flow chart of a first specific embodiment of the method for assessing a method of functioning of a fuel injector in response to the application of a control voltage.

Prior to an actual start of the method, a comparison value $R0$ is specified for a fuel content in an exhaust tract (step $S0$). For example, comparison value $R0$ is a fuel quantity or a fuel-air ratio. Comparison value $R0$ corresponds to a fuel content in the exhaust tract following a no-torque-producing completed injection of fuel into the associated combustion engine.

Step $S0$ may be carried out by the manufacturer prior to the initial operation of the fuel injector. Then the fuel injector is installed in a vehicle.

In a step $S1$, a control voltage $U$ for a no-torque-generating injection is applied to the at least one actuator of the fuel injector, for instance while the vehicle is being driven. In one specific embodiment, the at least one actuator is a piezo actuator. For example, control voltage $U$ is applied at a piston position at which no torque is released during a combustion of fuel possibly injected into the engine. In an advantageous manner, the piston position may be selected such that a fuel possibly injected into the engine is no longer ignited.

Control voltage $U$ is, for example, the control voltage specified by the manufacturer of the fuel injector, at the actually prevailing rail pressure p. In addition, control voltage $U$ may also be selected with regard to a current exhaust-gas temperature.

In a further step $S2$, a fuel content $R(U)$ in the exhaust tract is ascertained after control voltage $U$ has been applied to the at least one actuator. Fuel content $R(U)$ may be, for instance, a fuel quantity or an air/fuel ratio in the exhaust tract.

In step $S3$, fuel content $R(U)$ is then compared with comparison value $R0$. In this manner it is to be determined whether the fuel injector opens in response to the application of control voltage $Ti$ to the at least one actuator and whether fuel is injected into the internal combustion engine.

If measured fuel content $R(U)$ is smaller than comparison value $R0$, then in step $S4$ it is ascertained that the application of control voltage $U$ to the at least one actuator does not cause an opening of the fuel injector. If the fuel injector does not open when control voltage $U$ is applied, then this indicates probable drift of the at least one actuator or the switching chain. In this case it is necessary to newly determine control voltage $U$ required to open the fuel injector in order to reliably maintain the desired fuel quantities during the further operation of the fuel injector. A corresponding message is output subsequently.

If measured fuel content $R(U)$ lies above comparison value $R0$, then the application of control voltage $U$ to the actuator causes an opening of the fuel injector and thus an injection of fuel into the combustion engine. This is determined in step $S5$. A corresponding message is output in this case as well.

Figure 2:
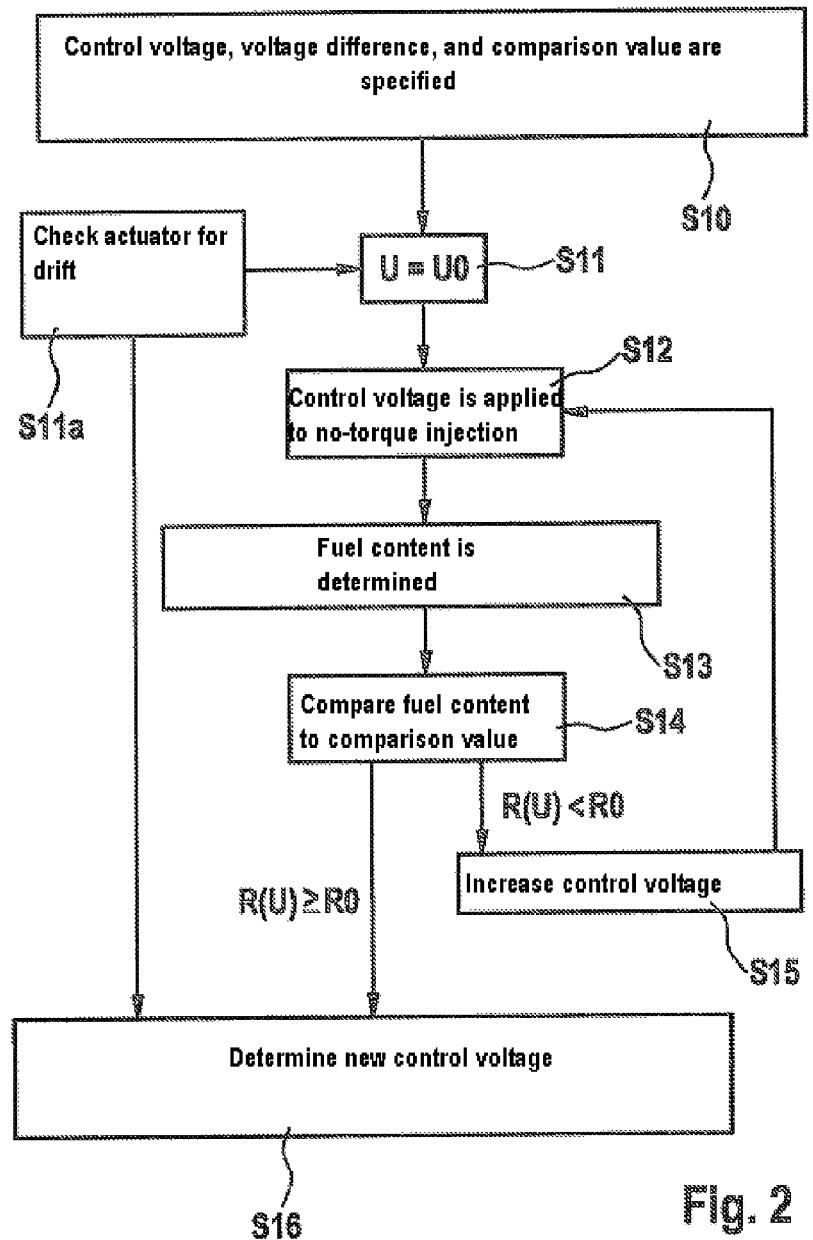
FIG. 2 shows a flow chart of a second specific embodiment of the method.

FIG. 2 shows a flow chart of a second embodiment of the method for assessing a method of functioning of a fuel injector in response to the application of a control voltage.

In a preceding step $S10$ of the method, an initial control voltage $U0$, a voltage difference $\Delta U$ and the already described comparison value $R0$ for a fuel content in the exhaust tract are specified. In one specific embodiment, this step $S10$ is performed by the manufacturer of the fuel injector prior to its initial operation.

Initial control voltage U0 is, for example, a control voltage suitable for opening the new fuel injector, which is ascertained by the manufacturer specifically for this fuel injector. Voltage difference ΔU will be explained in greater detail in the further text.

While the vehicle is driving, the method is started in a step S11a in order to check the at least one actuator and the switching chain of the fuel injector with regard to possible drift. An instantaneous rail pressure p is measured in the process. A control voltage U is selected from the provided initial control voltages U0 as a function of instantaneous rail pressure p (step S11).

In a further step S12, control voltage U is applied to the at least one actuator of the fuel injector for a no-torque-generating injection. It is especially advantageous if control voltage U is first applied to the at least one actuator of the fuel injector when the pistons are in a position at which fuel that is possibly injected into the engine is no longer ignited. An injection of fuel into the engine possibly taking place thus has barely any effect on the method of functioning of the engine. Possible changes in noise, e.g., engine noise or combustion noise, are avoided in the injection triggered as a post-injection. In the same way, no change in torque is caused, which is why the method is able to be used also during normal a driving operation.

In a subsequent step S13, a fuel content R(U), e.g., a fuel quantity or a fuel/air ratio, in the exhaust tract is determined. In one specific embodiment, fuel content R(U) is determined in that the fuel/air ratio in the exhaust tract is measured with the aid of a Lambda sensor and then evaluated using the measured value of an air-flow sensor installed in the air supply. Since the air-flow sensor and the Lambda sensor are usually already installed in many vehicles, this specific embodiment of step S13 is able to be implemented without the need to install an additional sensor in the vehicle.

In a further step S14, ascertained fuel content R(U) is compared with comparison value R0. If fuel content R(U) is smaller than comparison value R0, then it is determined that the application of control voltage U to the at least one actuator does not cause an opening of the fuel injector. This points to drift of the at least one actuator or the switching chain of the fuel injector. It is therefore advantageous if control voltage U for opening the fuel injector is determined anew in this situation.

In a subsequent method step S15, control voltage U is increased by voltage difference ΔU. Then, the method steps S12 through S14 are performed anew for the newly specified control voltage U. If determined fuel content R(U) is below comparison value R0 in this case as well, then the method steps S15 and S12 through S14 are repeated. This is continued until a fuel content R(U) is determined that lies above comparison value R0.

In the case of a fuel content R(U) above comparison value R0, it is determined that an opening of the fuel injector takes place (not shown in FIG. 2, however) when control voltage U is applied to the at least one actuator. In a further method step S16, the smallest control voltage U at which a fuel content R(U) greater than comparison value R0 is determined, is then specified as newly determined control voltage Un(p). A fingerprint for the individual drift of the at least one actuator and/or the switching chain is then able to be determined using this newly determined control voltage Un(p). On the basis of this fingerprint, a new characteristics curve may then be specified for a suitable control voltage U for opening the switching valve as a function of the particular rail pressure p.

In one further development of the method, if the measured fuel content is greater than comparison value R0, then control voltage U may be reduced by a specified minimum voltage difference following step S14. The minimum voltage difference may be considerably smaller than voltage difference ΔU. Steps S12 through S14 are then repeated until a fuel content R(U) below comparison value R0 is measured again. In this way smallest control voltage U at which a fuel content R(U) just above comparison value R0 can be determined is then able to be ascertained. Such an iteration step may be executed in order to specify an even more precise control voltage Un(p). Control voltage Un(p) newly determined in the process may then be analyzed and/or used for operating the fuel injector, as described above. However, it is also possible to dispense with such an iteration step for the more precise determination of the newly ascertained control voltage Un(p), in that, for example, a relatively small voltage difference ΔU is specified.

As an alternative to the fuel/air ratio, the fuel content is also able to be determined as air/fuel ratio. In this case an opening of the fuel injector may be determined if the ascertained air/fuel ratio is smaller than a specified comparison value. An opening of the fuel injector that has failed to occur notwithstanding the application of a control voltage is determined if the ascertained air/fuel ratio is greater than a specified comparison value. This is not illustrated in FIGS. 1 and 2, however.

Figure 3:
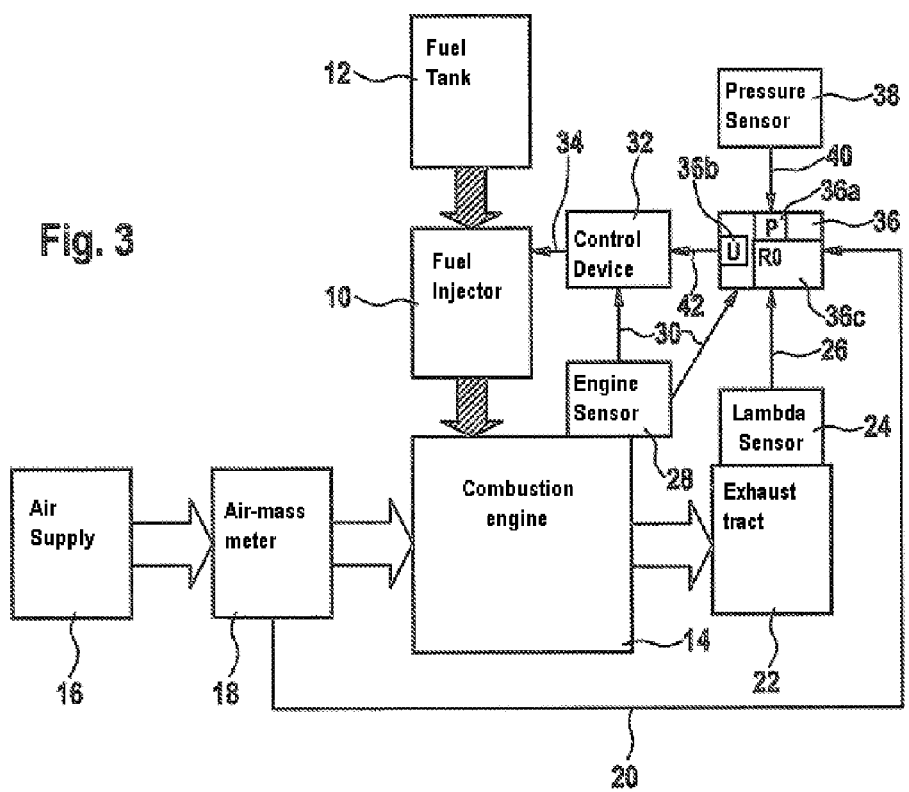
FIG. 3 shows a schematic to illustrate a function of the evaluation device to assess a method of functioning of a fuel injector in response to the application of a control voltage.

FIG. 3 shows a schematic to illustrate a function of the evaluation device for assessing a method of functioning of a fuel injector in response to the application of a control voltage to an actuator of the fuel injector.

Fuel injector 10 to be checked is situated between a fuel tank 12 and a combustion engine 14. If fuel injector 10 is open, then fuel is injected from fuel tank 12 into combustion engine 14.

Combustion engine 14 is also connected to an air supply 16. An air-mass meter 18, which measures the air quantity supplied into combustion engine 14 and provides a corresponding first sensor signal 20, is situated within air supply 16.

Furthermore, combustion engine 14 has an output to an exhaust tract 22. A Lambda sensor 24 is situated in exhaust tract 22.

Lambda sensor 24 is designed to determine a fuel/air ratio in exhaust tract 22 and to supply a corresponding second sensor signal 26.

In addition, an engine sensor system 28 is situated at combustion engine 14, which may be used to determine a piston position. A third sensor signal 30 supplied by engine sensor system 28 includes the angle following top dead center and is output to an injection control device 32.

Injection control device 32 is designed to control fuel injector 10 with the aid of a voltage signal 34 applied to at least one actuator (not shown) once third sensor signal 30 including the angle following top dead center has been received from engine control system 28, in such a way that fuel injector 10 is opened or closed at a specific angle following top dead center 30.

In the following text, the method of functioning of an evaluation device 36 for assessing a method of functioning of fuel injector 10 in response to the application of a control voltage U will be discussed.

Via a receiving device 36a, evaluation device 36 receives a fourth sensor signal 40 with a rail pressure p determined by a pressure sensor 38 installed in the vehicle. An output device 36b of evaluation device 36 then outputs a control voltage U corresponding to rail pressure p to injection control device 32 as control signal 42. Injection control device 32 is controlled by control signal 42 in such a way that it applies a voltage signal 34 corresponding to control voltage U for a no-torque-generating injection to the actuator of fuel injector 10. For this purpose, injection control device 32 waits for an angle following top dead center, at which fuel injected into combustion engine 14 is no longer ignited.

In one alternative specific embodiment, engine sensor system 28 may output third sensor signal 30 with the determined angle following top dead center 30 also to evaluation device 36. In this case, evaluation device 36 outputs control signal 42 to injection control device 32 only at a specific angle following top dead center.

Evaluation device 36 receives second sensor signal 26 with the measured fuel/air ratio in combustion exhaust tract 22 from Lambda sensor 24. In addition, evaluation device 36 receives first sensor signal 20 with the air quantity supplied into combustion engine 14 from air-mass meter 18. A comparison device 36c of evaluation device 36 then determines the fuel quantity supplied into combustion engine 14 on the basis of these data. The calculated fuel quantity is then compared with comparison value R0. If the fuel quantity injected into combustion engine 14 lies above comparison value R0, then evaluation device 36 detects that fuel injector 10 is opened in response to the application of the particular control voltage U to the at least one actuator.

However, if calculated fuel quantity is smaller than comparison value R0, then evaluation device 36 detects that the application of control voltage U to the at least one actuator of fuel injector 10 does not cause an opening of fuel injector 10. The particular control voltage U is thus unsuitable for opening fuel injector 10. If this control voltage U corresponds to the value specified by the manufacturer for new fuel injector 10, then drift of the at least one actuator and/or the switching chain has occurred.

Furthermore, the minimally required voltage . . . by the evaluation device 36 in that the described measuring method is repeated using different control voltages U. Minimally required control voltage U for an injection determined in this manner is then stored in characteristics maps individually for each cylinder, and thus is available for drift compensation of the actuators.

What is claimed is:

1. A method for assessing a process of functioning of a fuel injector in response to an application of a control voltage to at least one actuator of the fuel injector, the method comprising:
   (a) applying the control voltage to the at least one actuator of the fuel injector for a no-torque-generating injection into an engine;
   (b) determining a fuel content in an exhaust tract disposed at the engine;
   (c) comparing the determined fuel content with a specified comparison value; and
   (d) assessing the process of functioning of the fuel injector based on the comparison result.

2. The method of claim 1, wherein it is determined that the application of the control voltage to the at least one actuator does not cause an opening of the fuel injector if the determined fuel content is less than the comparison value, and it is determined that the application of the control voltage to the at least one actuator causes an opening of the fuel injector if the determined fuel content is greater than the comparison value.

3. The method of claim 1, wherein the fuel content in the exhaust tract is determined with the aid of a Lambda sensor.

4. The method of claim 1, wherein the task (a) is executed at a piston position at which no torque is released in a combustion of fuel possibly injected into the engine.

5. The method of claim 1, wherein the task (a) is executed at a piston position at which the fuel possibly injected into the engine is no longer ignited.

6. The method of claim 1, wherein a rail pressure is measured, and the process of functioning of the fuel injector is evaluated as a function of the rail pressure.

7. The method of claim 1, wherein an initial value for the control voltage is output at the beginning of the process.

8. The method of claim 6, wherein, if a determined fuel content is smaller than the comparison value, the control voltage is increased by a first specified voltage difference and the tasks (a) through (c) are repeated at least once more to determine as newly determined control voltage a control voltage whose application to the at least one actuator causes an opening of the fuel injector.

9. The method of claim 7, wherein, if the determined fuel content is greater than the comparison value, the control voltage is reduced by a second specified voltage difference, the tasks (a) through (e) are repeated at least once more, and then the smallest control voltage is determined as newly determined control voltage, at whose application to the at least one actuator an opening of the fuel injector is determined.

10. The method of claim 8, wherein, based on the newly determined control voltage, a characteristics curve for an optimal control voltage is determined as a function of the rail pressure.

11. An evaluation device for assessing a process of functioning of a fuel injector in response to the application of a control voltage to at least one actuator of the fuel injector, comprising:
   an output device to control the fuel injector with the aid of a control signal output to a controller of the fuel injector, with the control voltage, so that the control voltage is applied to the at least one actuator for a no-torque-generating injection into an engine;
   a receiving device to receive information about an ascertained fuel content in an exhaust tract situated at the engine, which information is provided by a sensor of the vehicle; and
   a comparison device to compare the ascertained fuel content with a specified comparison value, and to assess the process of functioning of the fuel injector based on the comparison result.

* * * * *

UNITED STATES PATENT AND TRADEMARK OFFICE
CERTIFICATE OF CORRECTION

PATENT NO.         : 8,700,288 B2                                          Page 1 of 1
APPLICATION NO. : 12/600802
DATED              : April 15, 2014
INVENTOR(S)        : Huber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Twenty-ninth Day of September, 2015

Michelle K. Lee
*Director of the United States Patent and Trademark Office*